US008578181B2

(12) United States Patent
Tanaka

(10) Patent No.: US 8,578,181 B2
(45) Date of Patent: Nov. 5, 2013

(54) ELECTRIC DEVICE, AND METHOD AND COMPUTER PROGRAM PRODUCT FOR CONTROLLING POWER SUPPLY IN ELECTRIC DEVICE

(75) Inventor: Satoshi Tanaka, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 566 days.

(21) Appl. No.: 12/796,179

(22) Filed: Jun. 8, 2010

(65) Prior Publication Data

US 2011/0004776 A1 Jan. 6, 2011

(30) Foreign Application Priority Data

Jul. 3, 2009 (JP) ................................. 2009-159051
Apr. 23, 2010 (JP) ................................. 2010-100354

(51) Int. Cl.
*G06F 1/26* (2006.01)

(52) U.S. Cl.
USPC ........................................................ 713/300

(58) Field of Classification Search
USPC ........................................................ 713/300
See application file for complete search history.

(56) References Cited

U.S. PATENT DOCUMENTS

| 6,965,763 | B2 * | 11/2005 | Bussan et al. | ............... | 455/343.4 |
| 7,426,647 | B2 * | 9/2008 | Fleck et al. | ................... | 713/320 |
| 7,428,391 | B2 | 9/2008 | Kobayashi | | |
| 7,868,479 | B2 * | 1/2011 | Subramaniam | ................. | 307/39 |
| 2009/0077292 | A1 | 3/2009 | Tanaka | | |

FOREIGN PATENT DOCUMENTS

| CN | 1892470 A | 1/2007 |
| JP | 7-129042 | 5/1995 |
| JP | 11-146103 | 5/1999 |
| JP | 2000-190596 | 7/2000 |
| JP | 2001-217964 | 8/2001 |
| JP | 2004-112410 | 4/2004 |
| JP | 2004-230605 | 8/2004 |
| JP | 4347529 | 7/2009 |

OTHER PUBLICATIONS

Chinese Office Action issued on May 29, 2012, in patent Application No. 201010222286X with English Translation.
Japanese Office Action (2010-100354) dated Aug. 6, 2013.

* cited by examiner

*Primary Examiner* — Kim Huynh
*Assistant Examiner* — Eric Chang
(74) *Attorney, Agent, or Firm* — Oblon, Spivak, McClelland, Maier & Neustadt, L.L.P.

(57) ABSTRACT

An electric device includes at least one or more processing units that perform a predetermined process; a power-supply control unit that controls supply of electric power from a power source to the processing units and shutoff of the supply; a main control unit that performs a start-up process if the main control unit is supplied with power from the power source; and a sub control unit that controls the power-supply control unit so as not to supply the electric power to all or some of the processing units after the start-up process.

11 Claims, 7 Drawing Sheets

ELECTRIC DEVICE, AND METHOD AND COMPUTER PROGRAM PRODUCT FOR CONTROLLING POWER SUPPLY IN ELECTRIC DEVICE

CROSS-REFERENCE TO RELATED APPLICATIONS

The present application claims priority to and incorporates by reference the entire contents of Japanese Patent Application No. 2009-159051 filed in Japan on Jul. 3, 2009 and Japanese Patent Application No. 2010-100354 filed in Japan on Apr. 23, 2010.

BACKGROUND OF THE INVENTION

1. Field of the Invention

The present invention relates to an electric device, and a method and a computer program product for controlling power supply in an electric device.

2. Description of the Related Art

In recent years, an image forming apparatus, such as a multi-function printer (MFP) having functions of a scanner, a printer, a facsimile machine, etc. and a laser printer (LP), has been in widespread use. One of the ways to improve convenience of the MPF and the like is a reduction of the start-up time. The start-up time is determined by the time taken for a fixing unit to be ready for operation. There is disclosed a technology for switching a fixing control unit for controlling the operation of a fixing unit in the transition from a power-saving mode to a normal operation mode and in the normal operation mode in order to reduce the time taken for the fixing unit to be ready for operation (for example, see Japanese Patent Application Laid-open No. 2002-268441).

While the time taken for a fixing unit to be ready for operation has been reduced with the advance in technology of the fixing unit as described above, there is a case where, due to the enlarged size of software in a controller unit for controlling an image forming apparatus, the start-up time of the image forming apparatus, such as an MFP, is determined by a factor of the controller unit. Accordingly a problem on the side of the controller unit has been recognized.

To solve the above problem, there has been developed a technology for reducing the start-up time in such a manner that a dynamic random access memory (DRAM) in which a program is decompressed, and the decompressed program is constantly supplied with electric power so as to return from STR (Suspend To RAM) each time.

To keep an image forming apparatus, such as an MFP, in a standby state, in most cases, the main power of the image forming apparatus is to be turned on, for example, immediately after a user comes into office in the morning. A recently-popularized image forming apparatus, such as an MFP, contains functionally-different units for achieving a plurality of functions; when the main power of the image forming apparatus is turned on, in most cases, electric power is once distributed to all blocks including a unit that consumes a large amount of electric power in the image forming apparatus, such as an image forming unit. If there is no print request or operation input for more than a certain period of time, the control to make the transition to a power-saving mode is generally performed automatically by a timer contained in the image forming apparatus or manually by a user's operation input.

However, there is a problem that if the image forming apparatus is not used until the image forming apparatus makes the transition to the power-saving mode, electric power for going into a normal operation mode once at start-up (referred to as "initial start-up power") goes to waste. It is known that much power is consumed especially by a fixing unit in an electrophotographic image forming in the image forming apparatus; therefore, from a standpoint of the demand for environment-friendliness and power conservation of the MFP and the like, it is important to eliminate the initial start-up power.

To solve the problem mentioned above, there is disclosed a technology for setting either to start up an image forming apparatus in a normal operation mode or to make the transition to a power-saving mode immediately after the start-up of the image forming apparatus (for example, see Japanese Patent Application Laid-open No. 2004-230605).

In the technology disclosed in Japanese Patent Application Laid-open No. 2004-230605, either to start up the image forming apparatus in the normal operation mode or to make the transition to the power-saving mode immediately after the start-up is determined on the basis of a history of use of the image forming apparatus, such as the number of times of the transition to the power-saving mode or a printing frequency. However, this determination method does not respond to all situations. For example, even when the image forming apparatus is powered on and started up in the normal operation mode on the basis of its history of use, if the image forming apparatus is not used for a certain period of time, initial start-up power may result in a waste. Furthermore, in Japanese Patent Application Laid-open No. 2004-230605, the settings of the image forming apparatus at the time of initial arrival are not mentioned; if the image forming apparatus is set to be started up in the normal operation mode when the image forming apparatus is initially powered on, and the image forming apparatus is not used for a while at first, initial start-up power may result in a waste.

Moreover, in returning from the power-saving mode due to a job request, i.e., when electric power is distributed to each unit to decompress a program, as described above, it takes time to initialize each unit, to perform a start-up process such as decompression of a program, and to execute the program, so that a user may have to wait for the execution of a job until the image forming apparatus is ready for operation. This is a serious matter especially in fax transmission; at the receipt of a fax, if electric power is to be supplied to a fax unit after the initial call-in, and a program is to be decompressed, and then the fax unit is to receive the fax, the communication latency on the fax sending side is increased, which may result in an increase in communication cost.

SUMMARY OF THE INVENTION

It is an object of the present invention to at least partially solve the problems in the conventional technology.

According to an aspect of the present invention, there is provided an electric device including: at least one or more processing units that perform a predetermined process; a power-supply control unit that controls supply of electric power from a power source to the processing units and shutoff of the supply; a main control unit that performs a start-up process if the main control unit is supplied with power from the power source; and a sub control unit that controls the power-supply control unit so as not to supply the electric power to all or some of the processing units after the start-up process.

According to another aspect of the present invention, there is provided a power-supply control method performed in an electric device that includes at least one or more processing units for performing processes respectively and differently; a power-supply control unit for controlling supply of electric power from a power source to the processing units and shutoff of the supply; a main control unit for performing a start-up process if the main control unit is supplied with power form the power source; and a sub control unit for controlling the power-supply control unit so as not to supply the electric power to all or some of the processing units after the start-up process, the power-supply control method including: controlling the power-supply control unit so as to supply the electric power to the processing units, when the sub control unit receives a request for a job to be executed by all or some of the processing units.

According to still another aspect of the present invention, there is provided a computer program product including a computer-usable medium having computer-readable program codes embodied in the medium for controlling power-supply performed in an electric device that includes at least one or more processing units for performing processes respectively and differently; a power-supply control unit for controlling supply of electric power from a power source to the processing units and shutoff of the supply; a main control unit for performing a start-up process if the main control unit is supplied with power form the power source; and a sub control unit for controlling the power-supply control unit so as not to supply the electric power to all or some of the processing units after the start-up process, the program codes when executed causing a computer to execute: controlling the power-supply control unit so as to supply the electric power to the processing units, when the sub control unit receives a request for a job to be executed by all or some of the processing units.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of an electric device, and a method and a computer program product for controlling power supply in an electric device according to the present invention are explained in detail below with reference to the accompanying drawings.

Figure 1:
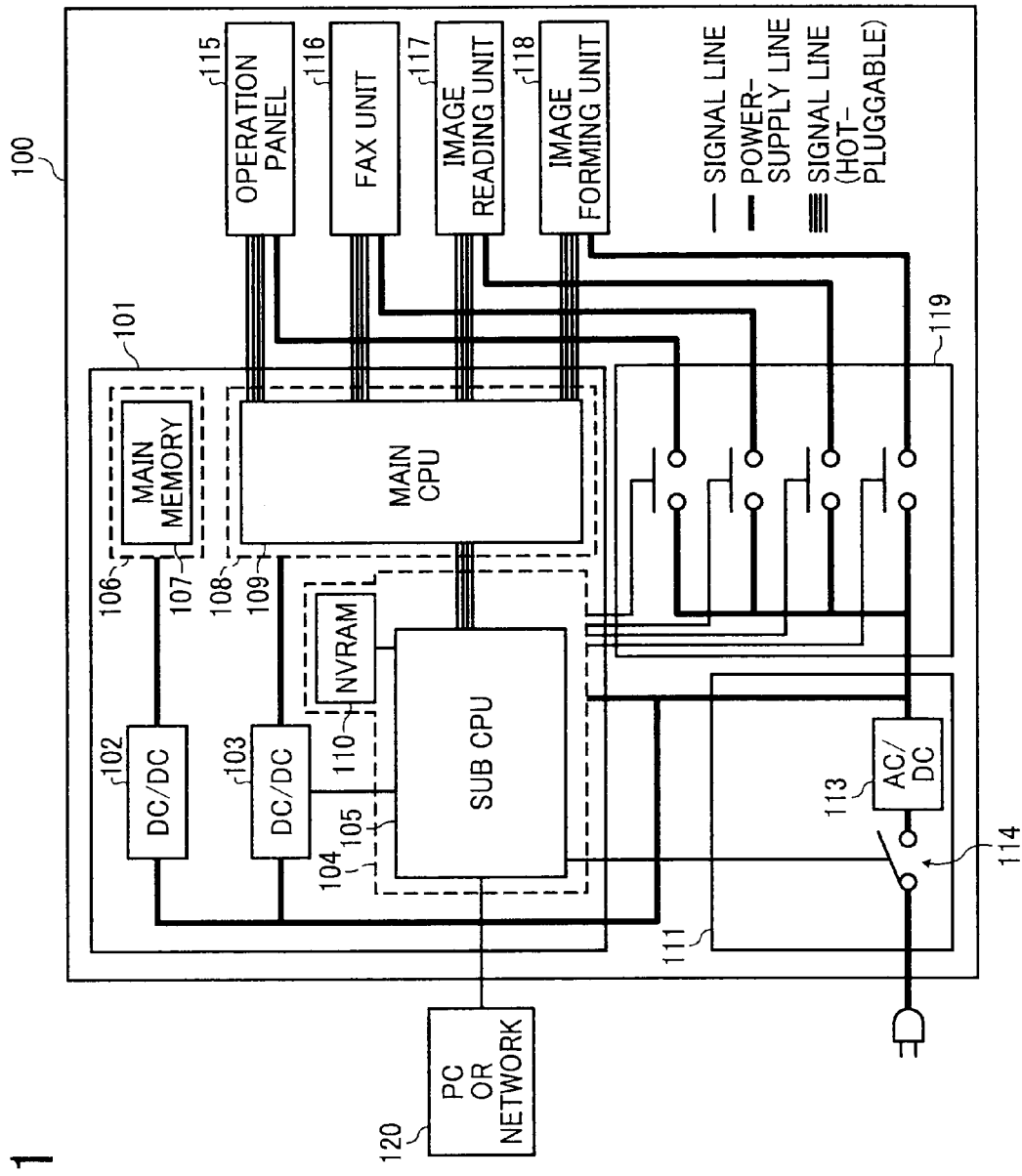
FIG. 1 is a diagram schematically illustrating a hardware configuration of an image forming apparatus according to a first embodiment.

FIG. 1 is a diagram schematically illustrating a hardware configuration of an image forming apparatus according to a first embodiment. As shown in FIG. 1, an image forming apparatus 100 according to the present embodiment includes units of a controller 101, a main power supply unit 111, an operation panel 115, a fax unit 116, an image reading unit 117, an image forming unit 118, and a power-supply control board 119. The operation panel 115, the fax unit 116, the image reading unit 117, and the image forming unit 118 are processing units for performing respective predetermined processes; particularly, the fax unit 116, the image reading unit 117, and the image forming unit 118 are the processing units for performing processes related to forming an image.

The controller 101 controls the entire image forming apparatus 100, and includes a main-memory-circuit power-supply generating unit 102, a main central processing unit (CPU) circuit power-supply generating unit 103, a sub CPU circuit 104, a main memory circuit 106, and a main CPU circuit 108. The controller 101 is connected to an external device 120 such as a personal computer (PC) via a dedicated line or a network. The network here is for example a local area network (LAN), an intranet, an Ethernet (registered trademark), the Internet, or the like. The main memory circuit 106 includes a main memory 107 and a termination voltage resistance A (not shown). The sub CPU circuit 104 includes a sub CPU 105 and a nonvolatile random access memory (NVRAM) 110. The main CPU circuit 108 includes a main CPU 109. The main memory 107 is for example a read-only memory (ROM), a DRAM, or the like, and stores therein various programs such as a system program and various application programs for image printing, image reading, and fax transmission, and various data. The main CPU 109 performs a start-up process by decompressing the system program stored in the main memory 107, thereby activating the controller 101. Furthermore, the main CPU 109 performs various processes by executing the various application programs stored in the main memory 107. The NVRAM 110 stores therein various data and various programs. The sub CPU 105 controls the power-supply control board 119 that controls the power distribution to each of the processing units to control the supply of electric power to each of the processing units and the shutoff of the supply. Furthermore, the sub CPU 105 controls the main-CPU-circuit power-supply generating unit (DC/DC) 103 to control the power distribution to the main CPU circuit 108 thereby controlling the supply and shut off the electric power to the main CPU 109. When the supply of electric power to the main CPU 109 is shut off, the sub CPU 105 executes various programs stored in the NVRAM 110 as a substitute for the main CPU 109, thereby controlling all or part of the image forming apparatus 100. The main-memory-circuit power-supply generating unit (DC/DC) 102 supplies electric power to the main memory circuit 106. The main-CPU-circuit power-supply generating unit (DC/DC) 103 supplies electric power to the main CPU 109 under the control of the sub CPU 105.

The main power supply unit 111 includes a main switch (ACSW) 114 and an AC/DC power-supply generating unit 113, and switches between the supply of electric power from an AC power supply to the AC/DC power-supply generating unit 113 and the shutoff of the power supply, by turning the main switch 114 on or off in accordance with the switching operation. The AC/DC power-supply generating unit 113 converts an alternating-current voltage (AC power), electric power supplied from the AC power supply, into a direct-current voltage (DC power), and supplies the DC power to the sub CPU circuit 104, the main-memory-circuit power-supply generating unit 102, the main-CPU-circuit power-supply generating unit 103, and the power-supply control board 119. The power-supply control board 119 controls the power distribution to each of the processing units under the control of the sub CPU 105. The operation panel 115 includes a display unit for displaying information thereon and an operation input unit for receiving a user's operation input, such as a keyboard and a mouse, and both units are integrally formed. The fax unit 116 sends and receives image data via a public network (fax transmission). The image reading unit 117 is, for example, a scanner for reading an image of an original with an imaging element, such as a charge-coupled device (CCD). The image forming unit 118 is, for example, a printer including a black-and-white plotter, a 1-drum color plotter or a 4-drum color plotter, an application specific integrated circuit (ASIC), and a fixing unit for fixing an image on a printed medium, such as paper. The image forming unit 118 performs various image processing such as error diffusion and gamma conversion on image data of an image read by the image reading unit 117 or on image data received from an external device such as the external device 120, and prints out an image on a printed medium using the image data after the image processing.

Explained here are the connection between the processing unit, i.e., each of the operation panel 115, the fax unit 116, the image reading unit 117, and the image forming unit 118 and the main CPU 109 and the connection between the main CPU 109 and the sub CPU 105. The processing unit and the main CPU 109 are connected by a signal line capable of transmitting a hot-plug enable signal. The main CPU 109 and the sub CPU 105 are connected by a signal line capable of transmitting a hot-plug enable signal. Hot plugging is the connection standard in which the connection or disconnection of the master side can be made in a state where the host side is being supplied with electric power. In the connection between the main CPU 109 and the processing unit, the main CPU 109 is the host side, and the processing unit is the master side. In the connection between the main CPU 109 and the sub CPU 105, the sub CPU 105 is the host side, and the main CPU 109 is the master side. Representative hot-pluggable signal lines include, but not be limited to, USB (Universal Serial Bus), PCI (Peripheral Component Interconnect), PCIe (PCI express), SATA (Serial ATA), etc. Due to such a configuration, even in a state where the sub CPU 105 is supplied with electric power, it is possible to switch between the supply of electric power to the main CPU 109 and the shutoff of the power supply. Furthermore, even in a state where the main CPU 109 is supplied with electric power, it is possible to switch between the supply of electric power to the processing unit and the shutoff of the power supply independently from each of the processing units. Incidentally, another configuration for switching between the supply of electric power to each processing unit and the shutoff of the power supply independently from each of the processing units will be explained in a second embodiment to be described below.

Subsequently, explained are various functions specific to the present embodiment, which are achieved by execution of various programs by the sub CPU 105. When the main switch 114 of the image forming apparatus 100 is turned on, and electric power is supplied from the AC power supply to the AC/DC power-supply generating unit 113, then electric power is supplied to the sub CPU circuit 104, and the sub CPU circuit 104 performs an initialization operation. When the initialization operation is completed, the sub CPU 105 causes electric power to be supplied from the main-CPU-circuit power-supply generating unit 103 to the main CPU circuit 108. When the main CPU circuit 108 completes an initialization operation so that the main CPU 109 performs a start-up process by decompressing the system program to be executed in the main memory 107, the activation of the controller 101 is completed. After that, the sub CPU 105 causes the power supply, which is from the main-CPU-circuit power-supply generating unit 103 to the main CPU circuit 108, to be shut off. As a result, the controller 101 makes the transition to a power-saving mode (STR). This state is referred to as a system (i.e., the controller 101) power-saving mode.

Under this state, when the sub CPU 105 receives a request for a job by receiving instruction data requesting for, for example, printing of an image or sending of a fax as image processing from the external device 120, the sub CPU 105 causes electric power to be supplied from the main-CPU-circuit power-supply generating unit 103 to the main CPU circuit 108, and controls the power-supply control board 119 to supply electric power from the power-supply control board 119 to the processing unit. As a result, the image processing is controlled by the main CPU 109, and the image processing is performed by the processing unit corresponding to the image processing. The processing unit corresponding to the image processing is the image forming unit 118 if the image processing is printing of an image, or the fax unit 116 and the image reading unit 117 if the image processing is sending of a fax. Incidentally, a state where electric power is supplied to the main CPU 109 and the processing unit is referred to as a normal operation mode. If a predetermined condition for the mode transition is met during the normal operation mode, the controller 101 including the sub CPU 105 makes the transition to a standby mode. The predetermined condition for the mode transition here is, for example, a state where there is no operation input through the operation panel 115 or a state where the fax unit 116, the image reading unit 117, and the image forming unit 118 are each not in operation continuously for more than a certain period of time. In the standby mode, the controller 101 is in a standby state so that power consumption is reduced as compared with that in the normal operation mode. Then, if a predetermined condition for the mode transition is met during the standby mode, the entire image forming apparatus 100 makes the transition to a power-saving mode. Incidentally, the predetermined condition for the transition to the standby mode and the predetermined condition for the transition to the power-saving mode can be configured to be either same or different from each other, and the certain period of time in each of the predetermined conditions for the mode transition can be configured to be same or different between the two.

Figure 2:
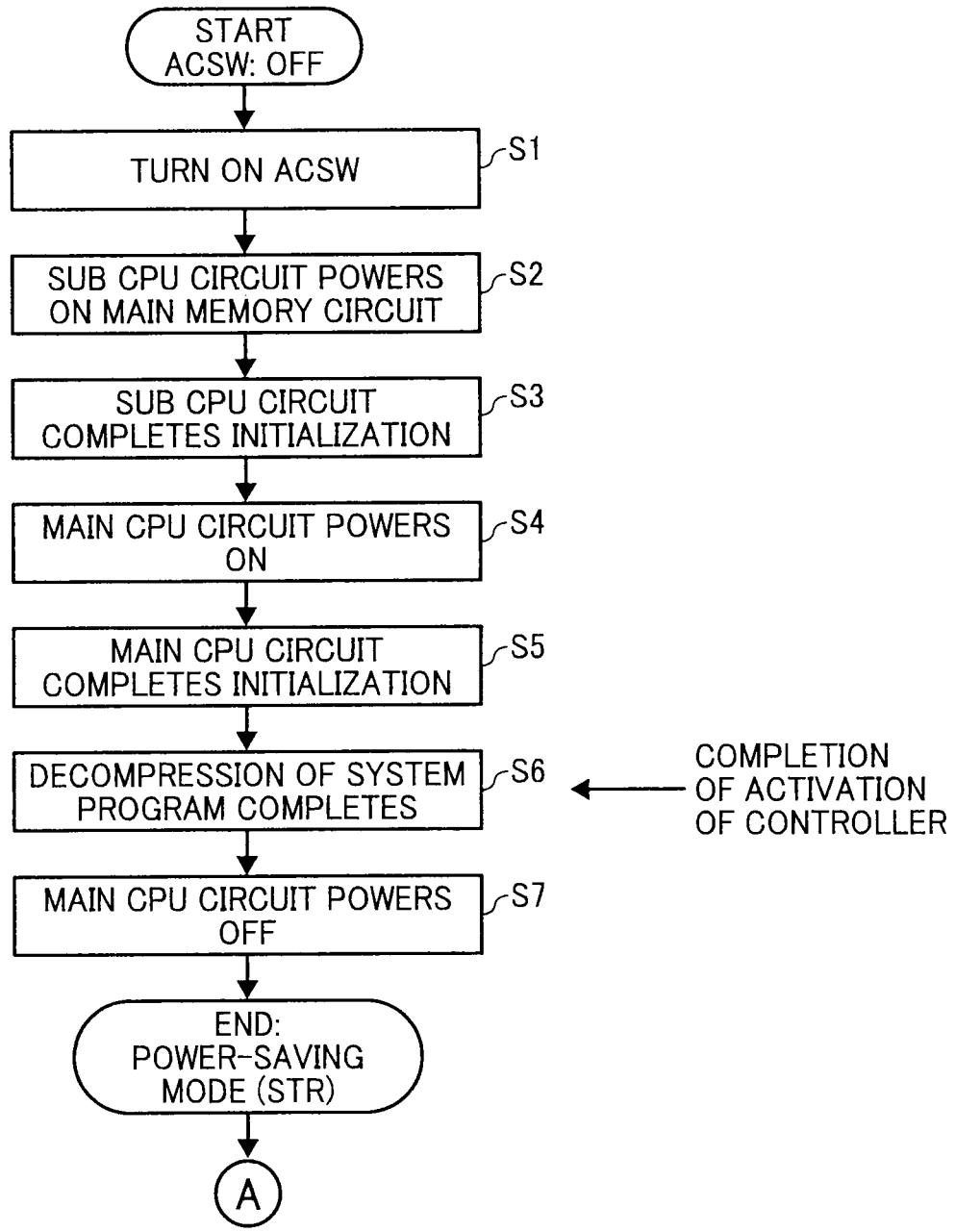
FIG. 2 is a flowchart illustrating a procedure of a start-up process of the image forming apparatus.

Subsequently, explained is a procedure of a start-up process of the image forming apparatus 100 according to the present embodiment with reference to FIG. 2. When the main switch 114 of the image forming apparatus 100 is turned on (Step S1), electric power is supplied to the AC/DC power-supply generating unit 113, and the AC/DC power-supply generating unit 113 supplies electric power to the sub CPU circuit 104, the main-memory-circuit power-supply generating unit 102, the main-CPU-circuit power-supply generating unit 103, and the power-supply control board 119; as a result, the electric power is supplied to the sub CPU circuit 104, and the electric power is supplied to the main memory 107 via the main-memory-circuit power-supply generating unit 102 (Step S2). The sub CPU circuit 104, supplied with the electric power, performs an initialization operation. When the initialization operation is completed (Step S3), the sub CPU 105 causes the electric power to be supplied from the main-CPU-circuit power-supply generating unit 103 to the main CPU circuit 108 (Step S4). Incidentally, here, the sub CPU 105 controls the power-supply control board 119 not to supply electric power from the power-supply control board 119 to each of the processing units. The main CPU circuit 108, supplied with the electric power, performs an initialization operation, and when the initialization operation is completed (Step S5), the main CPU 109 performs a start-up process by decompressing the system program to be executed in the main memory 107 (Step S6). After that, when the sub CPU 105 causes the power supply from the main-CPU-circuit power-supply generating unit 103 to the main CPU circuit 108 to be shut off (Step S7), the controller 101 makes the transition to the power-saving mode (STR). Incidentally, after that, if the sub CPU 105 receives a request for a job by receiving instruction data requesting for, for example, printing of an image as image processing from the external device 120, the sub CPU 105 causes the electric power to be supplied from the main-CPU-circuit power-supply generating unit 103 to the main CPU circuit 108, and controls the power-supply control board 119 to supply the electric power from the power-supply control board 119 to a corresponding processing unit. As a result, the electric power is supplied to the main CPU 109 and the processing unit. Then, the main CPU 109 executes the system program decompressed in the main memory 107 so as to make the transition to the normal operation mode, and executes an application program corresponding to the requested image processing, thereby causing the processing unit that corresponds to the image processing to perform the image processing. Thus, the job of the image processing is executed.

Figure 3:
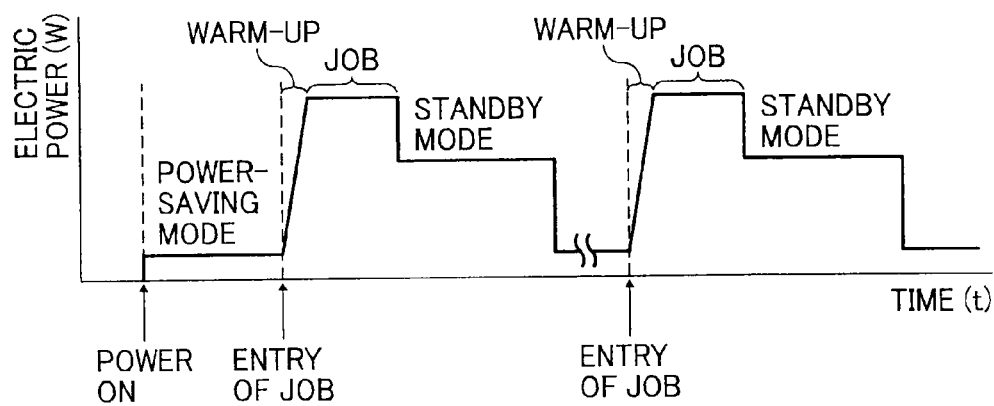
FIG. 3 is a timing chart illustrating a relation between time elapsed since the image forming apparatus is powered on and power consumption according to the first embodiment.
Figure 4:
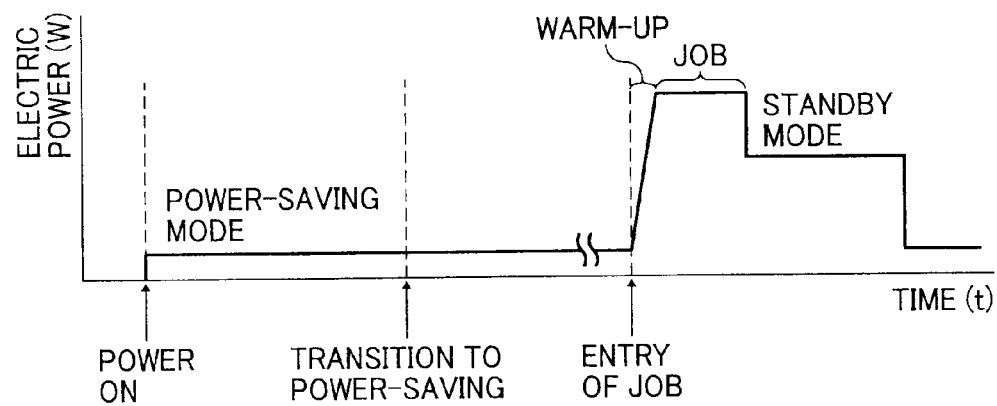
FIG. 4 is another timing chart illustrating the relation between time elapsed since the image forming apparatus according to the first embodiment is powered on and power consumption.
Figure 5:
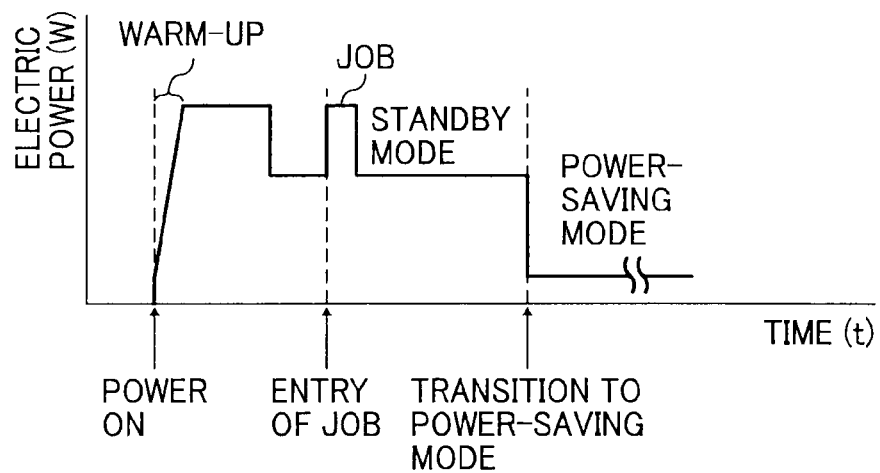
FIG. 5 is a timing chart illustrating a relation between time elapsed since a conventional image forming apparatus is powered on and power consumption.
Figure 6:
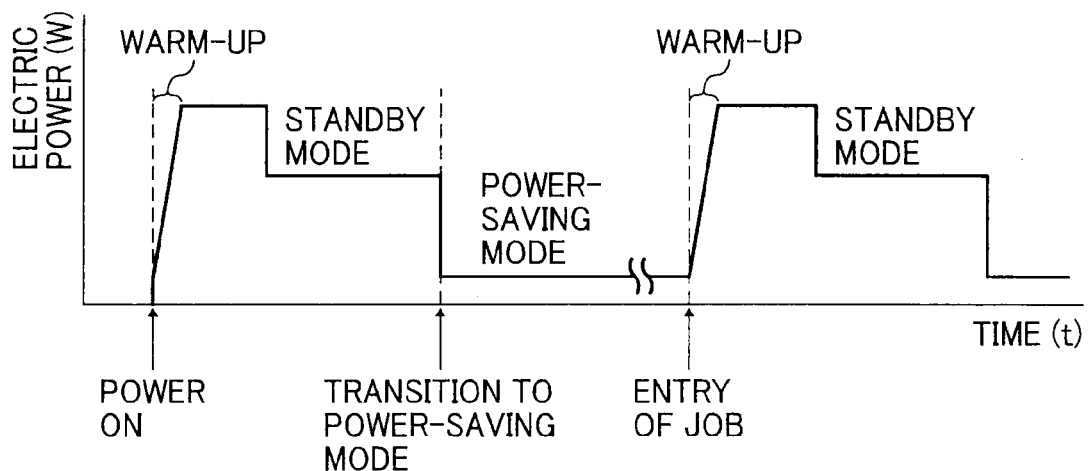
FIG. 6 is another timing chart illustrating the relation between time elapsed since the conventional image forming apparatus is powered on and power consumption.
Figure 7:
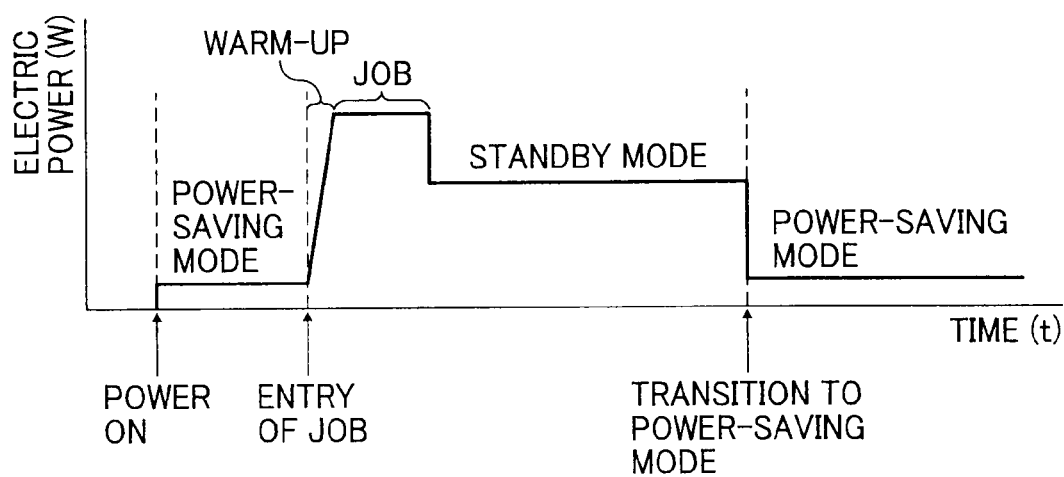
FIG. 7 is still another timing chart illustrating the relation between time elapsed since the conventional image forming apparatus is powered on and power consumption.

Explained with reference to FIGS. 3 and 4 is a relation between time elapsed since the main switch 114 (a power source) is turned on and power consumption in the image forming apparatus 100 according to the present embodiment. FIGS. 3 and 4 show that after the power source is turned on, and a start-up process is performed, the transition to the power-saving mode is made; when a request for a job is received and the job is entered, electric power is gradually supplied to a corresponding processing unit so as to make the transition to the normal operation mode (warm-up); after completion of the warm-up, the job is executed; after completion of the job, the transition to the standby mode is made; and after that, the transition to the power-saving mode is made. Incidentally, power consumption in the power-saving mode is the lowest, power consumption in the standby mode is the second lowest, and power consumption in the normal operation mode is the highest. On the one hand, in a conventional image forming apparatus for example as shown in FIG. 5, after the image forming apparatus is powered on and is started up, and warm-up is made, the transition to the normal operation mode is made; however, if a predetermined condition for the mode transition is met, the transition to the standby mode is made; when a job is entered, the transition to the normal operation mode is made, and the job is executed. In a case shown in FIG. 6, the conventional image forming apparatus is started up, and then the transition to the normal operation mode is made; after that, if a predetermined condition for the mode transition is met, the transition to the standby mode is made, and then the transition to the power-saving mode is made; when a job is entered, the transition to the normal operation mode is made, and the job is executed. Especially in the case shown in FIG. 6, even when the image forming apparatus is powered on, and the transition to the normal operation mode is made, if there is no request for a job for more than a certain period of time, the transition to the power-saving mode is made; thus, electric power for going into the normal operation mode at the start-up goes to waste. In the technology disclosed in Japanese Patent Application Laid-open No. 2004-230605 explained in description of the related art, in order to avoid such waste of electric power as much as possible, selection of a mode at the start-up is made on the basis of a history of use of the image forming apparatus. Consequently, for example, when the power-saving mode is selected as a mode at the start-up, as shown in FIG. 7, there is a case where after the image forming apparatus is powered on and started up, the transition to the power-saving mode is made; when a job is entered, the transition to the normal operation mode is made, and the job is performed; after completion of the job, the transition to the standby mode is made, and then the transition to the power-saving mode is made. However, if an actual mode at the start-up is different from what is assumed by a unit of selecting a mode at the start-up, a waste of electric power also occurs. Namely, even in the technology disclosed in Japanese Patent Application Laid-open No. 2004-230605, wasteful power consumption may occur in some cases, for example, as the case shown in FIG. 6.

On the other, the image forming apparatus 100 according to the present embodiment always starts up in the power-saving mode without selecting other mode at the start-up. Thus, as illustrated in FIGS. 3 and 4, in the image forming apparatus 100 according to the present embodiment, it is possible to eliminate wasteful power consumption that may occur when started up in the normal operation mode at the start-up. Namely, the image forming apparatus 100 according to the present embodiment is always started up in the power-saving mode, so it is possible to reduce wasteful power consumption.

Incidentally, in the image forming apparatus 100 according to the present embodiment, when the power is turned on, only the sub CPU circuit 104 and the main memory 107 are supplied with electric power, and the supply of electric power to the main CPU 109 and the corresponding processing units is triggered by the entry of a job. Consequently, wasteful power consumption can be further reduced.

Furthermore, while the power is on, the main memory 107 is always supplied with electric power regardless of a mode of the image forming apparatus 100, so that the main memory 107 can hold the decompressed system program or various data. Therefore, it is possible to shorten the time taken to start executing a job by making the transition from the standby mode or power-saving mode to the normal operation mode. Namely, the image forming apparatus 100 according to the present embodiment is capable of shortening the time from the entry of a job to the start of execution of the job, while reducing wasteful power consumption.

Subsequently, explained is a second embodiment of an electric device, and a method and a computer program product for controlling power supply in an electric device. Incidentally, portions in common with the above first embodiment are described by using the same reference numerals, or the description of those portions is omitted.

In the present embodiment, the power-supply control board 119 controls the supply of electric power to each processing unit and the shutoff of the power supply independently from each of the processing units. Namely, in the present embodiment, the power distribution to each processing unit is controlled by the power-supply control board 119 independently from each of the processing units, so that only a unit that receives a job during the power-saving mode or a unit that executes the received job is supplied with electric power, thus power consumption is optimized as needed.

Specifically, in the transition to the power-saving mode, the sub CPU 105 controls the power-supply control board 119 to supply electric power only to the operation panel 115 for receiving an operation input from a user and the fax unit 116 for receiving instruction data requesting for receipt of a fax out of the processing units. Furthermore, if the sub CPU 105 receives a request for a job via at least any of the external device 120 and the operation panel 115 during the power-saving mode, the sub CPU 105 determines a unit that needs to be supplied with electric power on the basis of a type of the job, and controls the power-supply control board 119 to supply electric power only to the unit that needs to be supplied with electric power. Moreover, in the same manner as in the first embodiment, the sub CPU 105 causes electric power to be supplied from the main-CPU-circuit power-supply generating unit 103 to the main CPU circuit 108 to transfer the control of execution of the job to the main CPU 109.

For example, if the sub CPU 105 receives instruction data requesting for printing an image as image processing request from the external device 120, the sub CPU 105 determines that a type of job is printing image, and in this case, determines that the image forming unit 118 is needed to supply electric power out of the processing units. Namely, when printing image is performed as a job, it is only necessary to supply electric power to the image forming unit 118, and there is no need to supply electric power to the operation panel 115, the fax unit 116, and the image reading unit 117. Therefore, in this case, the sub CPU 105 controls the power-supply control board 119 to supply electric power only to the image forming unit 118.

If the sub CPU 105 receives an operation input requesting for reading image as image processing via the operation panel 115, the sub CPU 105 determines that a type of job is reading an image, and in this case, determines that a unit that needs to be supplied with electric power out of the processing units is the image reading unit 117. Namely, when reading an image is performed as a job, it is only necessary to supply electric power to the image reading unit 117, and there is no need to supply electric power to the operation panel 115, the fax unit 116, and the image forming unit 118. Therefore, in this case, the sub CPU 105 controls the power-supply control board 119 to supply electric power only to the image reading unit 117.

If the sub CPU 105 receives an operation input requesting for a confirmation of the setting of the image forming apparatus 100 or a change of the setting via the operation panel 115, the sub CPU 105 determines that a type of job is operational setting and in this case, determines that a unit that needs to be supplied with electric power out of the processing units is the operation panel 115. Namely, when information on the setting of the image forming apparatus 100 is displayed or the setting is changed as a job, it is necessary to supply electric power only to the operation panel 115, with no need of supplying to the fax unit 116, the image reading unit 117, and the image forming unit 118. Therefore, in this case, the sub CPU 105 controls the power-supply control board 119 to supply electric power only to the operation panel 115.

If the sub CPU 105 receives instruction data requesting for receiving a fax as an image processing via the fax unit 116, the sub CPU 105 determines that a type of job is receiving a fax, and in this case, determines that a unit needed to be supplied with electric power out of the processing units is the fax unit 116 and the image forming unit 118. Namely, when receiving a fax is as a job, it is necessary to supply electric power only to the fax unit 116 and the image forming unit 118, with no need of supplying electric power to the operation panel 115 and the image reading unit 117. Therefore, in this case, the sub CPU 105 controls the power-supply control board 119 to supply electric power only to the fax unit 116 and the image forming unit 118. Incidentally, the instruction data requesting for receiving a fax can includes not only image data but also an output condition indicating whether or not to immediately print out an image of the image data. In this case, if the output condition data included in the instruction data received via the fax unit 116 indicates not to immediately print out the image, the sub CPU 105 can control the power-supply control board 119 to supply electric power only to the fax unit 116 and not to supply electric power to the image forming unit 118.

If the sub CPU 105 receives an operation input requesting for sending of a fax as image processing via the operation panel 115, the sub CPU 105 determines that a type of job is sending of a fax, and in this case, determines that units that needs to be supplied with electric power out of the processing units are the operation panel 115, the fax unit 116, and the image reading unit 117. Namely, when sending of a fax is performed as a job of which the request is received via the operation panel 115, it is necessary to supply electric power only to the operation panel 115, the fax unit 116, and the image reading unit 117, with no need of supplying electric power to the image forming unit 118. Therefore, in this case, the sub CPU 105 controls the power-supply control board 119 to supply electric power only to the operation panel 115, the fax unit 116, and the image reading unit 117.

If the sub CPU 105 receives instruction data requesting for sending a fax as image processing from the external device 120, the sub CPU 105 determines that a type of job is sending of a fax, and in this case, determines that units needed to be supplied with electric power out of the processing units are the fax unit 116 and the image reading unit 117. Namely, when sending of a fax is performed as a job received via the external device 120, it is necessary to supply electric power only to the fax unit 116 and the image reading unit 117, with no need of supplying electric power to the operation panel 115 and the image forming unit 118. Therefore, in this case, the sub CPU 105 controls the power-supply control board 119 to supply electric power only to the fax unit 116 and the image reading unit 117.

Figure 8:
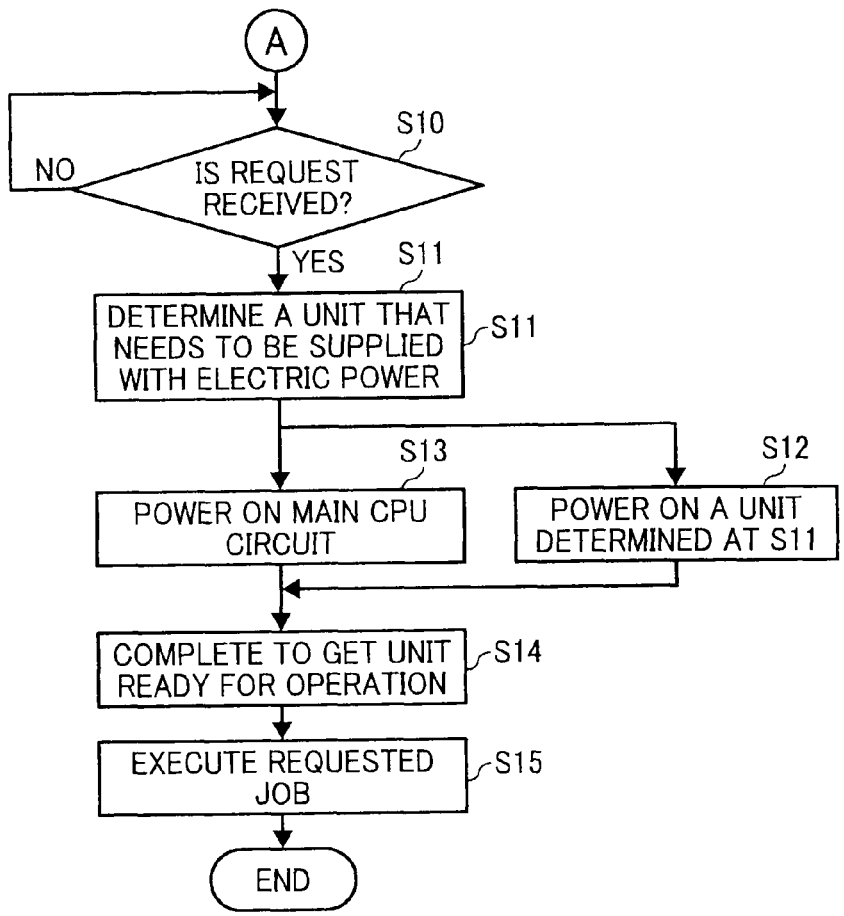
FIG. 8 is a flowchart illustrating a procedure of a process for executing a job in response to the entry of the job after start-up of an image forming apparatus according to a second embodiment.

Subsequently, with reference to FIG. 8 explained is a procedure of a process for executing a job in response to the entry of the job after start-up of the image forming apparatus 100 according to the present embodiment. Incidentally, a procedure of a process at the start-up of the image forming apparatus 100 is identical to that shown in FIG. 2, so that the description of the procedure of the process at the start-up is omitted. Explained is a procedure of a process after Step S7 in FIG. 2 in the following. In the image forming apparatus 100 that has made the transition to the power-saving mode, the sub CPU 105 waits for receiving a job. If the sub CPU 105 receives a request for a job via at least any of the external device 120 and the operation panel 115 (YES at Step S10), the sub CPU 105 determines a unit needed to be supplied with electric power on the basis of a type of the job (Step S11). The determination of the unit on the basis of a type of the job is as described above. Then, the sub CPU 105 controls the power-supply control board 119 to supply electric power only to the unit needed to be supplied with electric power (Step S12), and causes electric power to be supplied from the main-CPU-circuit power-supply generating unit 103 to the main CPU circuit 108 (Step S13). The processing order of Steps S12 and S13 is not limited to the above; the sub CPU 105 can perform the processes at Steps S12 and S13 concurrently, or can perform the process at Step S12 after performing the process at Step S13. The processing unit supplied with the electric power via the power-supply control board 119 is ready for operation (Step S14); and the main CPU 109, supplied with the electric power, controls the processing unit to execute the job (Step S15).

Figure 9:
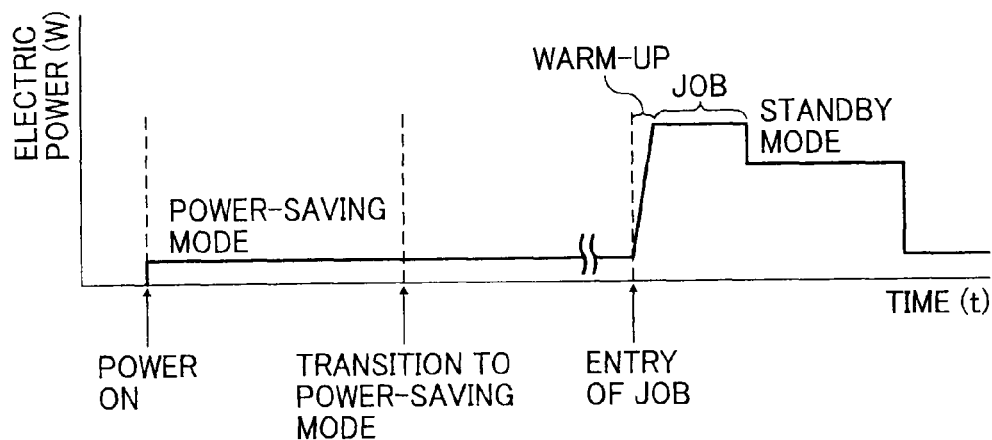
FIG. 9 is a timing chart illustrating a relation between time elapsed since the image forming apparatus is powered on and power consumption according to the second embodiment.

With reference to FIG. 9, there is explained power consumption at the entry of a job when the transition to the power-saving mode is made after the image forming apparatus 100 is powered on, and at Step S10, for example, then a job for reading an image is received. In this case, since electric power is supplied only to the image reading unit 117, with no electric power supplied to the operation panel 115, the fax unit 116, and the image forming unit 118, as described in the first embodiment with reference to FIG. 4. Therefore, power consumption at the entry of the job is reduced as compared with a situation where electric power is supplied to all the processing units.

As described above, the image forming apparatus 100 according to the present embodiment determines the minimum number of units needed for executing a job requested in the very stage of the power-saving mode, and then executes the job by causing electric power to be supplied only to the minimum units. Consequently, it is possible to reduce power consumption for the job. That is, just for a single job, consumption of electric power required just for executing the job can be achieved without consuming wasteful electric power caused by supplying electric power to the other processing units that are unnecessary for the job. Therefore, it is possible to minimize power consumption of the entire image forming apparatus 100.

Subsequently, a third embodiment of an electric device, and a method and a computer program product for controlling power supply in an electric device. Incidentally, portions in common with the above first or second embodiment are described by using the same reference numerals, or the description of those portions is omitted.

In the present embodiment, the sub CPU 105 of the image forming apparatus 100 is equipped with a time-clocking unit for clocking the time and timers for each of the processing units, and sets a period of time in which electric power is supplied until the power supply is shut off (referred to as the "shutoff setup time") independently from each of the processing units. Namely, in the image forming apparatus 100 according to the present embodiment, in the transition from the standby mode to the power-saving mode, the power supply to the processing units is not simultaneously shut off, but the shutoff of the power supply to each of the processing units can be set at a different timing from one processing unit to another. In general, it takes time for the image forming unit 118 including the fixing unit to be ready for operation by being supplied with electric power from the state where the supply of electric power is shut off, which means that the image forming unit 118 is slow to return to the operation mode. On the other hand, it does not take long time for the operation panel 115 or the fax unit 116 to be ready for operation by being supplied with electric power from the state where the supply of electric power is shut off, which means that the operation panel 115 and the fax unit 116 are quick to return to the operation mode. Taking advantage of such a difference in characteristics among the processing units, as for a unit that is slow to return, if a request for a job requiring the supply of electric power to the unit is received, the job can be smoothly executed by latening the time to shut off the power supply; as for a unit that is quick to return, wasteful power consumption can be reduced by hastening the shutoff of the power supply. To make this realisable, the image forming apparatus 100 according to the present embodiment sets a period of time in which electric power is supplied until the power supply is shut off (the shutoff setup time) independently from each of the processing units, thereby reducing power consumption efficiently.

Figure 10:
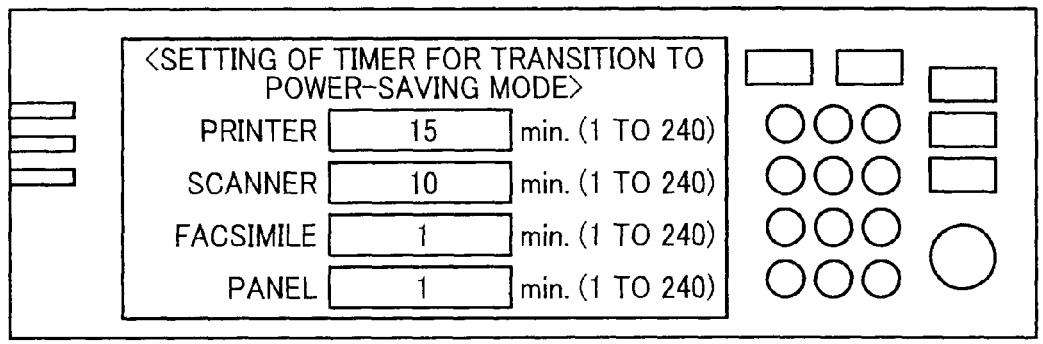
FIG. 10 is a diagram showing an example of a setting screen for setting the shutoff setup time displayed on an operation panel of an image forming apparatus according to a third embodiment.

The setting of the shutoff setup time of each of the processing units is, for example, made by a user's operational input via the operation panel 115 during the entry of a job. FIG. 10 is a diagram illustrating an example of a setting screen for setting the shutoff setup time displayed on the operation panel 115. A printer illustrated in FIG. 10 corresponds to the image forming unit 118; a scanner corresponds to the image reading unit 117; a facsimile machine corresponds to the fax unit 116; a panel corresponds to the operation panel 115. When a user performs an operational input for specifying the shutoff setup time for any of the processing units, the sub CPU 105 sets the shutoff setup time to the timer corresponding to the processing unit. Incidentally, on the setting screen in FIG. 10, not a fixed value of the shutoff setup time of each processing unit but a countdown of the shutoff setup time, i.e., the remaining time based on the time elapsed from a certain point of time (for example, immediately after execution of a job) can be displayed. Then, the sub CPU 105 causes the time-clocking unit to clock the duration time in which there is no operational input via the operation panel 115 or the duration time in which each of the fax unit 116, the image reading unit 117, and the image forming unit 118 is not in operation (referred to as the "idle duration time"). And the sub CPU controls the power-supply control board 119 to shut off the supply of electric power to the processing unit, if the idle duration time reaches the shutoff setup time set to the timer of the processing unit. The sub CPU 105 performs such control for each of the processing units.

Figure 11:
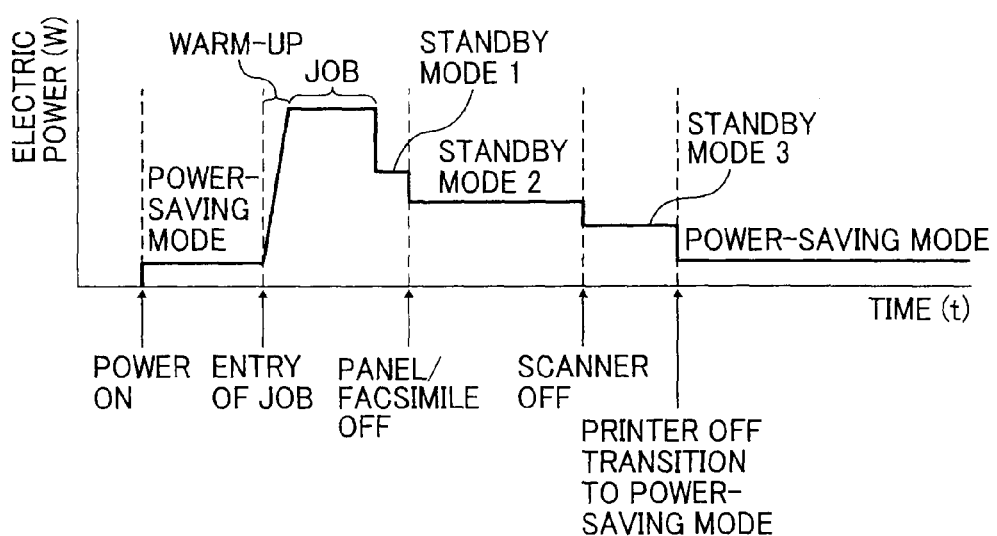
FIG. 11 is a timing chart illustrating a relation between time elapsed since the image forming apparatus is powered on and power consumption according to the third embodiment.

Specifically, with reference to FIG. 11, there is explained an example in which the transition to the power-saving mode is made after the image forming apparatus 100 is powered on and started up; a corresponding processing unit is supplied with electric power by the entry of a job, and makes the transition to the normal operation mode; the job is executed; and, the power supply to the processing unit is shut off. In this example, it will be assumed, for example, as illustrated in FIG. 10, that the shutoff setup time of the image forming unit 118 is set as 15 minutes; the shutoff setup time of the image reading unit 117 is set as 10 minutes; the shutoff setup time of the fax unit 116 is set as 1 minute; the shutoff setup time of the operation panel 115 is set as 1 minute. In this case, as shown in FIG. 11, after execution of the job, the controller 101 goes into a standby state (referred to as a "standby mode 1"); after 1 minute, the power supply to the operation panel 115 and the fax unit 116 is shut off (referred to as a "standby mode 2"); after 9 minutes, the power supply to the image reading unit 117 is shut off (referred to as a "standby mode 3"); after 5 minutes, the power supply to the image forming unit 118 is shut off; as a result, the entire image forming apparatus 100 makes the transition to the power-saving mode. In this manner, power consumption is reduced gradually in the standby mode 1, the standby mode 2, and the standby mode 3.

On the other hand, in the conventional image forming apparatus, as shown in FIG. 7, in the transition from the standby mode to the power-saving mode, the power supply to the processing units is simultaneously shut off. However, in the image forming apparatus 100 according to the present embodiment, as described above, each of the processing units makes the transition from the standby mode to the power-saving mode, as for the processing unit that is quick to return, the shutoff of the power supply is hastened; as for the processing unit that is slow to return, the shutoff of the power supply is latened, whereby the power supply to each of the processing units is gradually shut off. Consequently, it is possible to ensure convenience in using the image forming apparatus 100, and also possible to reduce power consumption in the standby mode.

Incidentally, the present invention is not limited to the above embodiments as it is; components can be embodied by being deformed without departing from the scope of the invention when implemented. Furthermore, various inventions can be formed by appropriate combinations of a plurality of components disclosed in the above embodiments. For example, some of the components described in the embodiments can be removed. Moreover, components can be arbitrarily combined in a different form. Furthermore, a variety of variations as described below as an example can be made.

In the embodiments described above, various programs executed by the image forming apparatus 100 can be stored in a computer connected to a network, such as the Internet, so that the programs can be provided by causing a user to download the programs over the network. Furthermore, it is also possible to provide the various programs in such a manner that the programs are recorded on a computer-readable recording medium, such as a CD-ROM, a flexible disk (FD), a CD-R, or a digital versatile disk (DVD), in installable or executable file format.

In the above embodiments, an MFP having a copy function, a scanner function, and a facsimile function is described as an example of the image forming apparatus 100 which is an electric device according to the present invention; however, the present invention is not limited to this; the image forming apparatus 100 can be an MFP having at least two of these functions, a copier having a copy function, a printer having a printer function, a scanner having a scanner function, a facsimile machine having a facsimile function, and the like. Furthermore, the electric device according to the present invention is not limited to an image forming apparatus, and can be, for example, a personal computer, a personal digital assistant, and a mobile phone.

In the above embodiments, the operation panel 115, the fax unit 116, the image reading unit 117, and the image forming unit 118 are described as processing units for performing different processes; however, the processing units are not limited to those mentioned above.

In the above embodiments, the connection between the sub CPU 105 and the main CPU 109 and the connection between the main CPU 109 and each of the units are each made by a signal line capable of transmitting a hot-plug enable signal; however, the connections are not limited to this; for example, some of the sub CPU 105 and the units, which are connected to the main CPU 109, can be connected to the main CPU 109 by a signal line capable of transmitting signal that can be processed by a hot-plug.

In the above third embodiment, the setting of the shutoff setup time for each unit is made due to a user's operational input through the setting screen shown in FIG. 10; however, the setting of the shutoff setup time is not limited to this, and can be made via the external device 120. Specifically, for example, when the sub CPU 105 of the image forming apparatus 100 receives instruction data requesting for the setting of the shutoff setup time for all or some of the units from the external device 120, the sub CPU 105 stores the shutoff setup time for each of the units requested in the instruction data in the NVRAM 110. If the already-stored shutoff setup time for a unit is to be changed, the sub CPU 105 updates the shutoff setup time stored in the NVRAM 110 to the shutoff setup time requested in the instruction data. Then, the sub CPU 105 causes the time-clocking unit to clock the idle duration time in the normal operation mode; if the idle duration time reaches the shutoff setup time stored in the NVRAM 110 that is set for the unit, the sub CPU 105 controls the power-supply control board 119 to cause the power-supply control board 119 to shut off the supply of electric power to the unit. The sub CPU 105 performs such control for each of the processing units. In such a configuration, the shutoff setup time can be set and changed from a remote location away from the image forming apparatus 100. Furthermore, the shutoff setup time is stored in the NVRAM 110, so that even if the image forming apparatus 100 is powered off, the setting data of the shutoff setup time is saved; thus, a user needs not set the shutoff setup time every time the image forming apparatus 100 is powered on, so that it is possible to improve convenience for the user.

According to the present invention, it is possible to suppress wasteful consumption of power at start-up.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electric device comprising:
    a main memory;
    at least one or more processing units that perform a predetermined process;
    a power-supply control unit that controls supply of electric power from a power source to the processing units and shutoff of the supply;
    a main control unit that performs a start-up process if the main control unit is supplied with power from the power source; and
    a sub control unit,
    wherein electric power is supplied only to the sub control unit and to the main memory that stores a program for the main control unit to execute the start-up process,
    wherein the sub control unit is configured to supply electric power to the main control unit after the sub control unit has performed an initialization operation, the sub control unit is configured to stop supplying electric power to the main control unit after the start-up process of the main control unit has been performed, and the sub control unit is configured to control the main control unit so that the main control unit is supplied again with the electric power if the main control unit receives a request for executing a predetermined process.

2. The electric device according to claim 1, wherein the power-supply control unit respectively controls the supply of power to the processing units independently from each other.

3. The electric device according to claim 1, wherein the sub control unit controls the supply of electric power from the power source to the main control unit and the shutoff of the supply, and
    the main control unit being connected to the sub control unit by a signal line capable of transmitting a hot-plug enable signal, and the main control unit can be connected to and disconnected from the sub control unit in a state where the sub control unit is being supplied with the electric power.

4. The electric device according to claim 1, wherein the processing units being connected to the main control unit by a signal line capable of transmitting a hot-plug enable signal, and the processing units can be connected to and disconnected from the main control unit in a state where the main control unit is being supplied with the electric power.

5. The electric device according to claim 1, wherein the sub control unit, when receives a request for a job to be executed by all or some of the processing units, controls the power-supply control unit to supply the electric power to the processing unit.

6. The electric device according to claim 1, wherein the sub control unit, when receives a request for a job to be executed by all or some of the processing units,
determines a first processing units that is needed for execution of the job out of the processing units, and controls the power-supply control unit to supply the electric power to the first processing unit.

7. The electric device according to claim 1, further comprising
a setting unit that sets a period of time in which electric power is supplied until the supply of the electric power is shut off for each of the processing units, wherein
the sub control unit controls the power-supply control unit to shut off supply of the electric power to each of the processing units depending on the period of time set for each of the processing units.

8. The electric device according to claim 7, further comprising
a communication unit that performs communication with an external device, wherein
the setting unit
sets the period of time based on the communication with the external device via the communication unit, and
stores set period of time in a nonvolatile storage medium.

9. The electric device according to claim 1, wherein the sub control unit controls the power-supply control unit so as not to supply the electric power to all or some of the processing units after the start-up process.

10. A power-supply control method performed in an electric device that includes
a main memory;
at least one or more processing units for performing processes respectively and differently;
a power-supply control unit for controlling supply of electric power from a power source to the processing units and shutoff of the supply;
a main control unit for performing a start-up process if the main control unit is supplied with power form the power source; and
a sub control,
the power-supply control method comprising:
controlling the power-supply control unit so as to supply the electric power to the processing units, when the sub control unit receives a request for a job to be executed by all or some of the processing units;
supplying electric power only to the sub control unit and to the main memory that stores a program for the main control unit to execute the start-up process;
controlling via the sub control unit, the supply of electric power to the main control unit after the sub control unit has performed an initialization operation;
stopping, via control from the sub control unit, a supply of electric power to the main control unit after the start-up process of the main control unit has been performed; and
controlling via the sub control unit, the main control unit so that the main control unit is supplied again with the electric power if the main control unit receives a request for executing a predetermined process.

11. A computer program product comprising a non-transitory computer-usable medium having computer-readable program codes embodied in the medium for controlling power-supply performed in an electric device that includes
a main memory;
at least one or more processing units for performing processes respectively and differently;
a power-supply control unit for controlling supply of electric power from a power source to the processing units and shutoff of the supply;
a main control unit for performing a start-up process if the main control unit is supplied with power form the power source; and
a sub control unit,
the program codes when executed causing a computer to execute:
controlling the power-supply control unit so as to supply the electric power to the processing units, when the sub control unit receives a request for a job to be executed by all or some of the processing units;
supplying electric power only to the sub control unit and to the main memory that stores a program for the main control unit to execute the start-up process;
controlling via the sub control unit, the supply of electric power to the main control unit after the sub control unit has performed an initialization operation;
stopping, via control from the sub control unit, a supply of electric power to the main control unit after the start-up process of the main control unit has been performed; and
controlling via the sub control unit, the main control unit so that the main control unit is supplied again with the electric power if the main control unit receives a request for executing a predetermined process.

\* \* \* \* \*